United States Patent [19]

Knowles

[11] Patent Number: 4,758,420
[45] Date of Patent: Jul. 19, 1988

[54] SOLVENT EXTRACTION OF POLYCHLORINATED ORGANIC COMPOUNDS FROM POROUS MATERIALS

[75] Inventor: Vera M. Knowles, Martinez, Calif.

[73] Assignee: The Dow Chemical Company, Midland, Mich.

[21] Appl. No.: 885,367

[22] Filed: Jul. 14, 1986

[51] Int. Cl.$^4$ .................... C01B 7/00; B09B 9/00; B09B 1/00; G21F 9/00
[52] U.S. Cl. .................... 423/659; 134/22.14; 134/22.19; 134/25.1; 134/42; 208/262; 405/129; 423/500; 110/342
[58] Field of Search ............... 423/659, 500; 134/22.14, 22.19, 25.1; 405/128, 129; 208/262

[56] References Cited

U.S. PATENT DOCUMENTS

| | | | |
|---|---|---|---|
| 3,773,676 | 11/1973 | Boyles | 252/171 |
| 4,425,949 | 1/1984 | Rowe, Jr. | 134/21 |
| 4,483,717 | 11/1984 | Olmstead | 134/22.19 |
| 4,507,155 | 3/1985 | Clark | 134/6 |
| 4,610,729 | 9/1986 | Keane | 208/262 |
| 4,662,948 | 5/1987 | Weitzman | 134/25.1 |

FOREIGN PATENT DOCUMENTS 3102746 9/1982 Fed. Rep. of Germany.
910851 3/1982 U.S.S.R..

*Primary Examiner*—Gary P. Straub

[57] ABSTRACT

The present invention relates to a process for the solvent extraction of polychlorinated organic compounds from porous materials. Specifically, the present invention describes a process for the use of a solvent extraction of polychlorinated organic compounds, such as hexachloroethane, hexachlorobutadiene and hexachlorobenzene from porous materials, such as a vinyl ester resin. When the level of hexachlorinated organic compounds is reduced to a level of 7 ppm or below, the porous material may be disposed of in an environmentally acceptable manner such as by incineration or by landfill.

17 Claims, 2 Drawing Sheets

[Example 2(b)] REMOVAL OF [HEX] FROM POLYMERIC MATERIAL (SAMPLE 2 IN PERCHLOROETHYLENE)

[Example 2(b)]

REMOVAL OF [HEX] FROM POLYMERIC MATERIAL
(SAMPLE 2 IN PERCHLOROETHYLENE)

SOLVENT EXTRACTION OF POLYCHLORINATED ORGANIC COMPOUNDS FROM POROUS MATERIALS

BACKGROUND OF THE INVENTION

1. Field of the Invention

The present invention pertains broadly to a process for the solvent extraction of polychlorinated organic compounds from porous materials. More particularly, the invention relates to a process for the extraction of hexachlorinated to decachlorinated organic compounds from porous materials, such as concrete, cement, and polymeric materials, such as vinyl ester resins, using a solvent or solvent system.

2. Relevant Art

Organic and chlorinated hydrocarbon organic solvents are known for their ability to remove ink, oils, greases and the like from machinery, metal parts, electronic equipment, printing equipment and the like. Usually cloths are soaked with the solvent, and the grease is removed by manually wiping the equipment. In other applications, small parts, such as electronic parts, are submerged into the solvent from ambient to boiling temperature to remove the undesired greases or oils.

U.S. Pat. No. 3,773,676 discloses the use of a nonflammable mixed solvent system consisting of low- and high-boiling noninflammable halogenated organic, such as, perchloroethylene and a light petroleum solvent such as mineral spirits, which is useful for removing inks, greases, and the like from printing equipment.

Cheek, in U.S. Pat. No. 4,507,155, discloses the use of a cleaning solvent comprising a chlorinated hydrocarbon, a petroleum distillate, and alcohol and ammonia for use in removing a dried printing ink residue from a substrate. Representative chlorinated hydrocarbons described by Cheek include chloroform, carbon tetrachloride, trichloroethane, tetrachloroethane, pentachloroethane, trichloroethylene and perchloroethylene. There is no teaching regarding the level of hexachlorinated organic compounds removed or remaining in the substrate. Also, West German Patent No. DE 3,102,746 and Sovient Union Pat. No. 910,851 are of general interest.

Polymeric structural materials are often found in the equipment used in the manufacture, processing and transportation of solvents. It is known that polymeric materials absorb quantities of chlorinated hydrocarbons, particularly hexachloroethane, during manufacture, transportation and storage. When the level of polychlorobiphenyls (PCB's) is 7 ppm or higher in any material, present environmental regulations in California will not permit it to be disposed of in an economical landfill operation (The level is 50 ppm on a national scale). Since hexachloroethane is less of an environmental problem than are the PCB's the designation for these levels of contaminants is conservative. Further, disposal by incineration or storage on site of, for instance contaminated polymeric material, is very costly.

There are no references disclosing the removal of chlorinated organic compounds from solid materials. It is, therefore, very desirable to have a simple, economical process to remove hazardous chlorinated hydrocarbons from porous materials, such as polymeric materials, so that the porous materials can be further used or disposed of in an environmentally acceptable manner.

It is an object of the present invention to provide an improved method of solvent extraction for removing highly chlorinated organic compounds from polymeric materials.

It is a further object of the present invention to provide a cleaning composition that is easy to handle and safe to use.

These and other objects will become apparent from the following description.

SUMMARY OF THE INVENTION

The present invention provides a method for reducing the level of hexachlorinated to decachlorinated organic compounds to a non-hazardous level in a porous material, which method includes (a) contacting the hexachlorinated to decachlorinated compound-containing porous material with an extraction solvent wherein the extraction solvent is methylene chloride, chloroform, carbon tetrachloride, trichloroethane, methylchloroform, tetrachloroethane, pentachloroethane, trichloroethylene, perchloroethylene, benzene, toluene, xylene, acetone, methyl ethyl ketone, or mixtures thereof at a temperature and for a time sufficient to remove the absorbed hexachlorinated organic compound; and (b) separating the hexachlorinated to decachlorinated organic compound-containing extraction solvent.

The hexachlorinated to decachlorinated organic compounds include, for example, hexachloroethane, hexachlorobutadiene, hexachlorobenzene, polychlorinated biphenyls or mixtures thereof. Preferably mixtures of hexachloroethane, hexachlorobutadiene and hexachlorobenzene are removed from polymeric materials.

The chlorinated hydrocarbon solvents listed above are generally known for cleaning or degreasing for various purposes. However, their use individually or as mixtures to remove environmentally hazardous polychlorinated hydrocarbons from porous materials is not presently disclosed in the art.

DETAILED DESCRIPTION OF THE INVENTION AND PREFERRED EMBODIMENTS

The present invention provides an improved composition and method for removing hazardous chlorinated hydrocarbons from porous materials. More particularly, the method is to remove hexachlorinated to decachlorinated hydrocarbons from polymeric materials to a level of less than 50 ppm (preferably 7 ppm) for disposal of the polymeric material in an environmentally acceptable manner.

"Porous" refers to any material which will absorb and retain the hazardous hexachlorinated organic compounds described herein. Porous materials include for example, concrete, soil, sand, and natural and synthetic polymeric materials. It generally does not include glass or solid metal objects, although polychlorinated compounds on the surface of glass and metals are removed by this process, and considered to be within this invention. Synthetic polymeric materials, such as vinyl ester resins (e.g., DERAKANE), are preferred in the present invention.

Often, the polymeric materials used in the construction of process equipment are from the DERAKANE family of polymers (a Trademark of the Dow Chemical Co.), a vinyl ester resin, such as No. 411-C450. This polymeric material may break down to hexachloroethane, hexachlorobenzene, and hexachlorobutadiene over months or years of contact with chlorine from a process. In our experiments, hexachloroethane contamination of a DERAKANE sample existed to at least a 0.5-inch penetration due to direct contact with chlorine vapor. The average level of hexachloroethane contamination for the entire polymeric equipment that has operated in contact with chlorine for 36 months is about 38 ppm. One sample was found to be contaminated with hexachloroethane at levels as high as 3,000 ppm. Yet most samples were of the order of 150-200 ppm concentration hexachloroethane. In one sample, 177 ppm of hexachloroethane was found. The surface part of the polymeric material has the highest hexachloroethane concentrations, in the range of 120 to 177 ppm. Lower concentrations of hexachloroethane are found at a penetration of 0.5 in from the surface.

Figure 1:
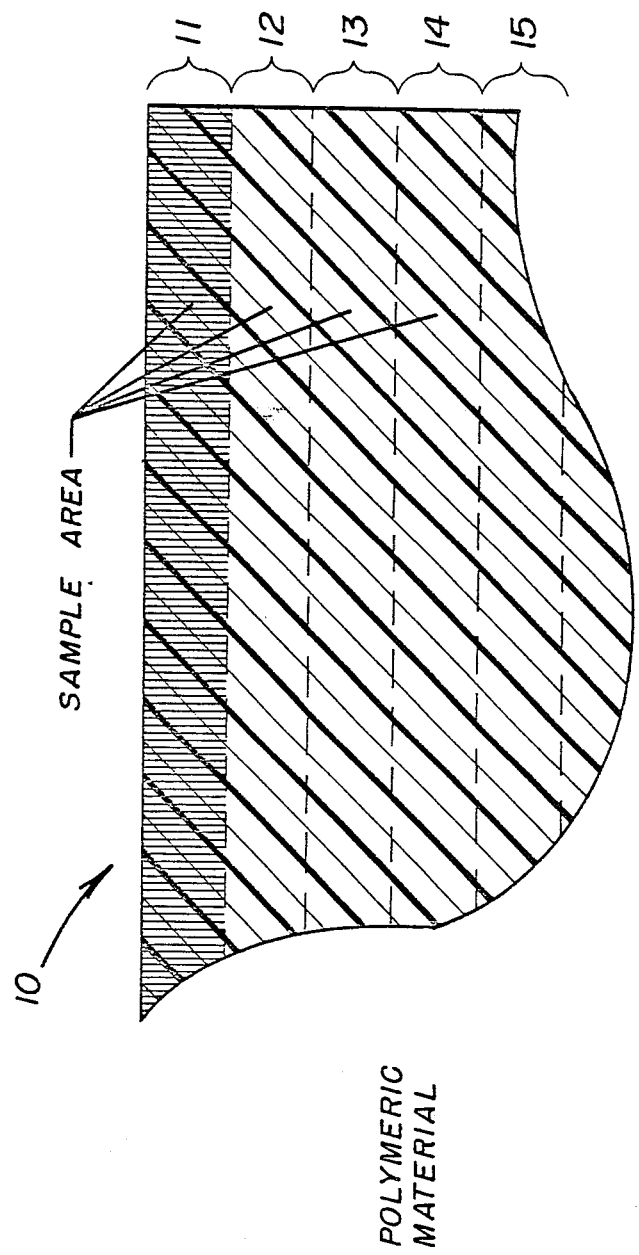
FIG. 1 shows a cross-sectional view of the porous polymeric material that is contaminated with hazardous polychlorinated hydrocarbons.

In FIG. 1 is shown a cross-section of a portion of the porous polymeric process equipment 10. The darker layer 11 is the portion of the process equipment which is the closest to and in contact with the gaseous chlorine. The other layers 12, 13, 14, etc., are deeper within the polymer frame and have correspondingly lower concentrations of hexachlorinated organic compounds or contaminants. The thickness of each layer—11, 12, 13, etc.—is generally about 1/16 in.

Generally, at levels within the polymeric material which are more remote from the chlorine source, the level of hexachlorinated compounds is significantly lower than 7 ppm. Obviously, the longer the polymeric material is exposed to chlorine, the higher is the buildup of hazardous hexachloroethane. The polymeric material cannot be disposed of by landfill in California without a treatment to reduce the level of hexachloroethane to less than 7 ppm.

The individual solvents described herein are generally known to remove greases and oils from objects for various purposes. However, the art does not disclose the use of these solvents to remove hexachlorinated to decachlorinated organic compounds from polymeric materials.

The extraction solvent of this invention may be applied to a contaminated polymeric material in a conventional manner, soaking a cloth and wiping the polymeric material until the hazardous hydrocarbon level is reduced to an acceptable level. Preferably, the extraction solvent is applied in a vapor degreasing process or continuously or intermittently using a spray or stream means. A preferred method is to immerse the polymeric material in a vat or other container of solvent. Conveniently, the solvent and contaminated polymer are in contact with each other at ambient pressure and temperature. However, extraction temperatures from between about 0° C. and the boiling temperature of the solvent or solvent mixture are useful. Agitation of the solvent during extraction is also helpful.

It is possible for the hazardous chlorinated hydrocarbon to be completely extracted by the solvent from the solid polymeric object. The time for the extraction is simply increased, and optionally fresh solvent is used.

Suitable chlorinated hydrocarbon extraction solvents include those having a boiling point in the range of between about 35° and 170° C. and include for example, methylene chloride, chloroform, carbon tetrachloride, trichloroethylene, tetrachloroethane, pentachloroethane, trichloroethylene and perchloroethylene or mixtures thereof. Perchloroethylene is preferred for the specific process described in Examples 1 and 2.

Suitable hydrocarbon solvents which are useful include hexane, benzene, toluene, xylene, acetone, methyl ethyl ketone, or mixtures thereof. Mixtures including hydrocarbon and chlorinated hydrocarbon solvents are also contemplated in the present invention.

The materials which are extracted in the present invention include any porous material that is contaminated with high levels of chlorinated substances so that the contaminated materials cannot be land filled. These include for example, cement, concrete, vinyl ester resins, polyethylene, polypropylene, poly(methyl methacrylate), wood, and the like.

Generally, the extraction solvent is placed in a container at ambient pressure and between ambient temperature and the boiling point of the solvent. Preferably, temperatures between about 10° C. and 30° C. are used. In some cases, the polymeric material can be powered or shredded to provide a higher surface area for extraction and, therefore, a shorter extraction time.

Generally, the polymeric material is simply broken into chunks or pieces or may be immersed as a whole unit into the extraction solvent. After a period of time, the polymeric materials is separated from the solvent and analyzed. The extraction solvent containing the hexachlorinated to decachlorinated hydrocarbons may then be incinerated, recycled or re-distilled for re-use.

The focus of the present invention is to obtain a polymeric material having less than 7 ppm of hazardous hexachlorinated to decachlorinated hydrocarbon, which can be disposed of in an environmentally acceptable manner, including landfill, combination with other materials for roadbeds, etc., combustion and the like.

The following Examples are to be construed to be illustrative only and are not to be considered to be limited in any way.

Analytical procedure to determine chlorinated hydrocarbons extracted from polymeric materials—A sample of polymeric material, about 5 g, is weighed to the nearest 0.01 g and continuously extracted in a Soxhlet extractor using about 150 ml of hexane. The continuous extraction proceeds overnight, about 18 to 19 hrs. The reaction mixture is cooled and collected. The system is extracted twice with 5 ml of hexane and collected. An aliquot of the hexane solution is then analyzed by gas-liquid chromatography using a Hewlett-Packard Model 5800 with electron capture detector using an SE 54 fused silica capillary column 25 m×0.3 mm ID available from Hewlett-Packard, Santa Clara, Calif. A gas chromatograph-mass spectrometer of the Finnegan Co. 4000 series is used for separation and identification of the components. The major contaminant is found to be hexachloroethane.

EXAMPLE 1

Extraction of Vinyl Ester Resin

A 5 g sample of used porous polymeric process equipment [DERAKANE 411-C450 (Trademark of Dow Chemical Company) a vinyl ester resin], containing 154 ppm of hexachloroethane is placed in a tank containing 1680 g of perchloroethylene at ambient temperature 23°–25° C. After 60 minutes, the DERAKANE sample is removed from the perchloroethylene and dried. The surface of the DERAKANE sample now contains less than 7 ppm of hexachloroethane. This represents a 90–95% removal of the hexachloroethane. The DERAKANE polymer may then be disposed of by landfill.

At 52° C., only 40 min is required to obtain a polymer surface level of hexachloroethane less than 7 ppm.

EXAMPLE 2

Extraction of Vinyl Ester Resin (a) A 3.75 g sample of DERAKANE polymer containing 102 ppm of hexachloroethane is extracted in the manner described in Example 1, except that the solvent extraction is over a total time period of 120 minutes. The extraction of the hexachloroethane in the perchloroethylene is between 95 and 99% complete. The level of the hexachloroethane in the DERAKANE is less than 7 ppm, and the DERAKANE polymer is then disposed of by landfill.

Figure 2:
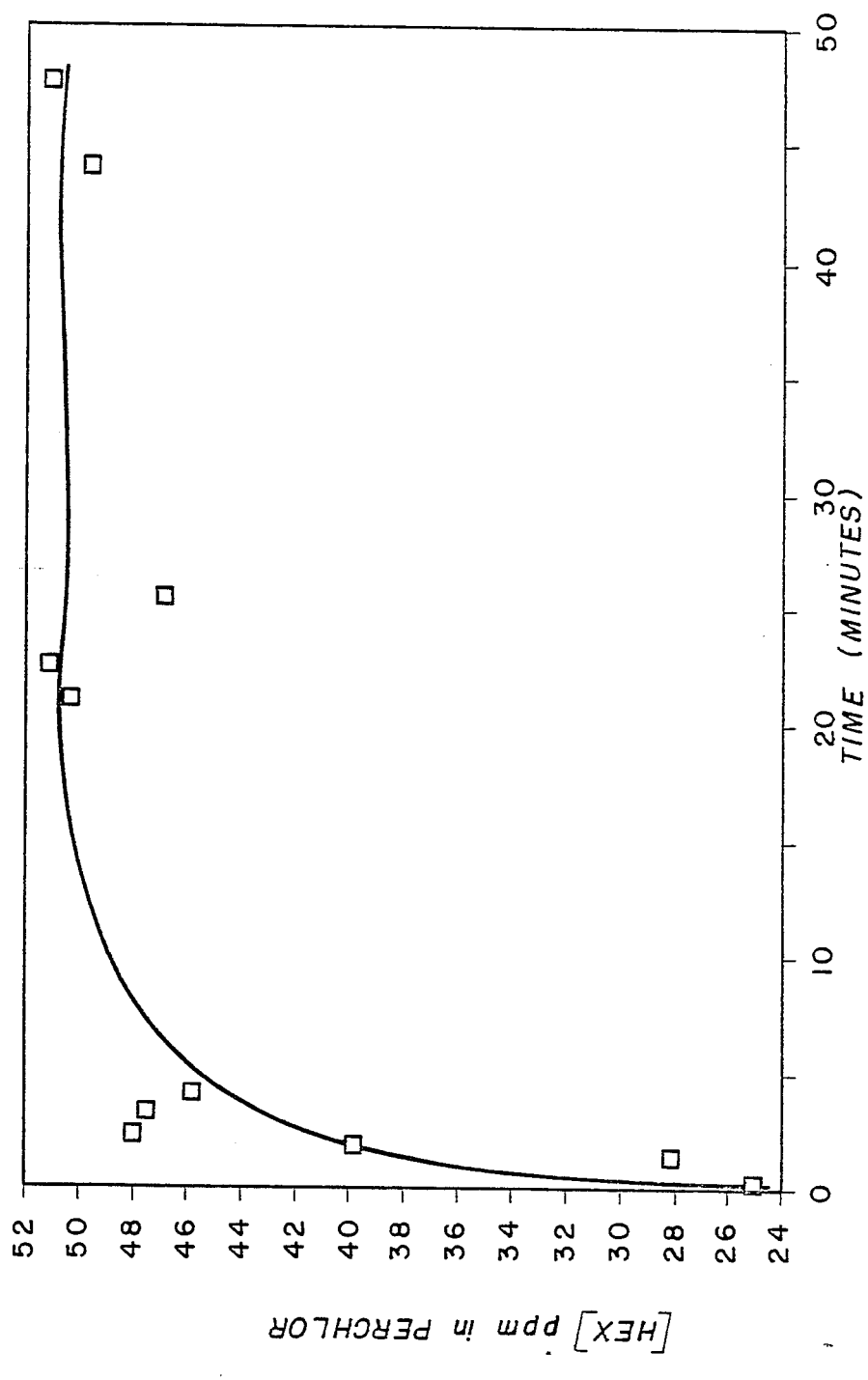
FIG. 2 shows the amount of hexachlorinated materials accumulating in the perchloroethylene used as solvent as a function of time.

(b) In FIG. 2 is shown the results of an experiment performed as in Example 2(a). The amount of hexachlorinated compounds (essentially hexachloroethane) accumulating in perchloroethylene is shown as a function of time. As can be seen, the amount of hexachloroethane in the solvent is a constant value after about 25 minutes. This shows that the removal of the hexachloroethane from this polymer sample is essentially complete after 25 minutes.

EXAMPLE 3

Extraction of Vinyl Ester Resin

A 6.71 g sample of DERAKANE containing about 113 ppm of hexachloroethane is extracted in the manner described in Example 1, except that the extraction solvent is carbon tetrachloride, 1850 g. After extraction, the level of the hexachloroethane in the DERAKANE is less than 7 ppm, and the DERAKANE is then disposed of by landfill.

While only a few embodiments of the invention have been shown and described herein, it will become apparent to those skilled in the art that various modifications and changes can be made in the extraction process without departing from the spirit and scope of the present invention. All such modifications and changes coming within the scope of the appended claims are intended to be carried out thereby.

We claim:

1. A method of reducing the level of hexachlorinated organic compounds selected from hexachloroethane, hexachlorobutadiene, hexachlorobenzene, or mixtures thereof to a non-hazardous level in a solid, porous DERAKANE ® vinyl ester resin, which has been previously used as the material of construction of a cell to produce chlorine, which vinyl ester resin was in contact with chlorine during chlorine manufacture which method comprises:

(a) contacting the hexachlorinated compound-containing porous vinyl ester resin with an extraction solvent wherein the extraction solvent is selected from chloroform, carbon tetrachloride, trichloroethane, methyl chloroform, tetrachloroethane, perchloroethylene, benzene, toluene, xylene, acetone, methyl ethyl ketone, or mixtures thereof, at a temperature and for a time sufficient to remove the absorbed hexachlorinated organic compound; and (b) separating the hexachlorinated organic compound-containing extraction solvent and vinyl ester resin.

2. The method of claim 1 wherein the hexachlorinated organic compound is substantially hexachloroethane.

3. The method of claim 2 wherein the extraction solvent is methyl chloroform.

4. The method of claim 2 wherein the extraction solvent is perchloroethylene.

5. The method of claim 4 wherein the non-hazardous level of hexachlorinated organic compound is less than 50 ppm.

6. The method of claim 5 wherein the temperature in step (a) is between about 10° and 30° C.

7. A method for the disposal of DERAKANE ® vinyl ester resin which has been previously used as the material of construction of a cell to produce elemental chlorine, which vinyl ester resin was in direct contact with the elemental chlorine during chlorine production, and is contaminated with hexachlorinated organic compounds wherein the hexachlorinated organic compound is selected from hexachloroethane, hexachlorobutadiene, hexachlorobenzene, or mixtures thereof, which method comprises:

(a) contacting the hexachlorinated organic compound-containing vinyl ester resin with an extraction solvent which is selected from chloroform, carbon tetrachloride, trichloroethane, methyl chloroform, tetrachloroethane, perchloroethylene, benzene, toluene, xylene, or mixtures thereof, at a temperature and for a time sufficient to reduce the level of hexachlorinated organic compound in the porous material to an environmentally acceptable level;

(b) separating the extraction solvent and vinyl ester resin; and (c) disposing of the treated vinyl ester resin of step (b) in an environmentally acceptable manner.

8. The method of claim 7 wherein the hexachlorinated organic compound is substantially hexachloroethane.

9. The method of claim 8 wherein the extraction solvent is trichloroethane.

10. The method of claim 8 wherein the extraction solvent comprises perchloroethylene.

11. The method of claim 10 wherein in step (a) the environmentally acceptable level of hexachlorinated to decachlorinated organic compound is less than 7 ppm.

12. The method of claim 11 wherein the temperature in step (a) is between about 10° and 30° C.

13. The method of claim 12 wherein in step (c) the environmentally acceptable manner of disposal is landfill.

14. The method of claim 11 in step (c) the environmentally acceptable manner of disposal is incineration.

15. The method of claim 8 wherein in step (a) the extraction solvent is methylchloroform.

16. The method of claim 15 wherein in step (a) the temperature is between about 10° and 30° C. and the time of extraction is between about 10 and 120 minutes.

17. The method of claim 16 wherein the separated extraction solvent of step (b) is subsequently recycled.

* * * * *